United States Patent
Estrakh et al.

(10) Patent No.: US 10,609,220 B2
(45) Date of Patent: Mar. 31, 2020

(54) METHOD AND SYSTEM FOR ACCESSING AN IPA AGENT FROM A PHONE

(71) Applicant: DSP Group Ltd.

(72) Inventors: Daniel Estrakh, Nir Banim (IL); Effi Shiri, Petah Tikva (IL)

(73) Assignee: DSP Group Ltd., Herzliya (IL)

(*) Notice: Subject to any disclaimer, the term of this patent is extended or adjusted under 35 U.S.C. 154(b) by 66 days.

(21) Appl. No.: 15/878,457

(22) Filed: Jan. 24, 2018

(65) Prior Publication Data

US 2018/0220003 A1 Aug. 2, 2018

Related U.S. Application Data

(60) Provisional application No. 62/450,581, filed on Jan. 26, 2017, provisional application No. 62/480,354, filed on Apr. 1, 2017.

(51) Int. Cl.
| | |
|---|---|
| *H04M 3/527* | (2006.01) |
| *H04L 29/12* | (2006.01) |
| *H04M 1/253* | (2006.01) |
| *H04L 12/66* | (2006.01) |
| *H04M 7/00* | (2006.01) |
| *H04L 12/725* | (2013.01) |

(52) U.S. Cl.
CPC ............ *H04M 3/527* (2013.01); *H04L 12/66* (2013.01); *H04L 61/1529* (2013.01); *H04M 1/2535* (2013.01); *H04L 45/306* (2013.01); *H04M 7/006* (2013.01)

(58) Field of Classification Search
CPC ... H04L 12/66; H04L 61/1529; H04L 45/306; H04M 1/2535; H04M 3/527; H04M 7/006
USPC ........................................ 379/201.01, 221.14
See application file for complete search history.

(56) References Cited

U.S. PATENT DOCUMENTS

| | | | |
|---|---|---|---|
| 10,171,675 B1 * | 1/2019 | McCobb | H04M 3/541 |
| 2007/0036334 A1 * | 2/2007 | Culbertson | H04M 3/4938 379/266.01 |

* cited by examiner

*Primary Examiner* — Harry S Hong
(74) *Attorney, Agent, or Firm* — Reches Patents

(57) ABSTRACT

A gateway, computer program product and a method for accessing an IPA agent, the method may include (a) receiving, by the gateway and over a wired communication link, a request to initiate a phone call; (b) determining, by the gateway, whether to direct the phone call to the IPA agent or to another agent that differs from the IPA agent; (c) directing the phone call to the IPA agent when determining to direct the phone call to the IPA agent; and (d) directing the phone call to the other agent when determining to direct the phone call to the other agent.

24 Claims, 4 Drawing Sheets

US 10,609,220 B2

METHOD AND SYSTEM FOR ACCESSING AN IPA AGENT FROM A PHONE

CROSS REFERENCE

This application claims priority from U.S. provisional patent 62/450,581 filing date Jan. 26, 2017 and from U.S. provisional patent 62/480,354 filing date Apr. 1, 2017.

BACKGROUND

Voice interactive Intelligent Personal Assistants include Apple's Ski, Google's Google Home, Amazon Alexa, Microsoft's Cortana, Samsung's S Voice, LG G3's Voice Mate, BlackBerry's Assistant, IBM's Watson, and more.

The voice interactive intelligent personal assistants are accessed via the Internet using powerful computerized devices such as smartphones and/or dedicated devices (Amazon Echo/Dot/Tap, Google Home, etc.).

There is a growing need to make the voice interactive intelligent personal assistants available via other probably cheaper devices.

SUMMARY

There may be provided a method for accessing an intelligent personal assistant (IPA), the method may include (a) receiving, by a gateway over a wired communication link, a request to initiate a phone call; determining, by the gateway, whether to direct the phone call to the IPA agent or to another agent that differs from the IPA agent; (b) directing the phone call to the IPA agent when determining to direct the phone call to the IPA agent; and (c) directing the phone call to the other agent when determining to direct the phone call to the other agent.

The method may include determining to direct the phone call to the IPA agent when detecting a predefined IPA indicator in the request.

The predefined IPA indicator may include a unique sequence of dialed symbols.

The predefined IPA indicator consists of a unique dialed symbol.

The predefined IPA indicator may include unique audio content.

The directing the phone call to the IPA agent may include informing the IPA agent about an upstream resource allocated for conveying upstream audio from the phone to the IPA agent.

The method may include informing the IPA agent about a downstream resource allocated for conveying downstream audio from the IPA agent.

The method may include receiving, over the downstream resource, downstream audio from the IPA agent; and conveying the downstream audio to the phone.

The downstream source and the upstream source may be time division multiplexing (TDM) slots.

The method may include receiving the request to initiate a phone call from a phone having a type that may be selected out of multiple types of phones, wherein the multiple types of phones may include a voice over internet protocol (VoIP) phone, a plain old telephone service (POTS) phone and a digital enhanced cordless telecommunication (DECT) phone.

The method may include receiving a request to initiate a phone call of a first type of phone calls by a first circuit of the gateway; determining, by the first circuit, whether to direct the phone call of the first type to the IPA agent; receiving a request to initiate a phone call of a second type of phone calls by a second circuit of the gateway; and determining, by the second circuit, whether to direct the phone call of the second type to the IPA agent. The first circuit may be a computer, any part of a computer, more than a single computer, a hardware processor that executes instructions, a server that execute, a core of a hardware processor any any combination of memory and logic circuits. The hardware processor may be a general-purpose processor, a hardware accelerator, a graphic processor, a digital signal processor, a field programmed gate array, an ASIC, one or more integrated circuits, a server, and the like.

There may be provided a computer program product that stores instructions that once executed by a gateway causes the gateway to perform the steps of: (a) receiving, by a gateway over a wired communication link, a request to initiate a phone call; (b) determining, by the gateway, whether to direct the phone call to an intelligent personal assistant (IPA) agent or to another agent that differs from the IPA agent; (c) directing the phone call to the IPA agent when determining to direct the phone call to the IPA agent; and (d) directing the phone call to the other agent when determining to direct the phone call to the other agent.

The computer program product that stores instructions for determining to direct the phone call to the IPA agent when detecting a predefined IPA indicator in the request.

The predefined IPA indicator may include a unique sequence of dialed symbols.

The predefined IPA indicator consists of a unique dialed symbol.

The predefined IPA indicator may include unique audio content.

The directing the phone call to the IPA agent may include informing the IPA agent about an upstream resource allocated for conveying upstream audio from the phone to the IPA agent.

The computer program product that stores instructions for informing the IPA agent about a downstream resource allocated for conveying downstream audio from the IPA agent.

The computer program product that stores instructions for receiving, over the downstream resource, downstream audio from the IPA agent; and conveying the downstream audio to the phone.

The downstream source and the upstream source may be time division multiplexing (TDM) slots.

The computer program product that stores instructions for receiving the request to initiate a phone call from a phone having a type that may be selected out of multiple types of phones, wherein the multiple types of phones may include a voice over internet protocol (VoIP) phone, a plain old telephone service (POTS) phone and a digital enhanced cordless telecommunication (DECT) phone.

The computer program product may include instructions for receiving a request to initiate a phone call of a first type of phone calls by a first circuit of the gateway; determining, by the first circuit, whether to direct the phone call of the first type to the IPA agent; receiving a request to initiate a phone call of a second type of phone calls by a second circuit of the gateway; and determining, by the second circuit, whether to direct the phone call of the second type to the IPA agent.

There may be provided a gateway having intelligent personal assistant (IPA) access capabilities, wherein the gateway may include circuits that may include a hardware processor, wherein the circuits may be configured to: receive, over a wired communication link, a request to initiate a phone call; determine whether to direct the phone call to an intelligent personal assistant (IPA) agent or to another agent that differs from the IPA agent; direct the phone call to the IPA agent when determining to direct the phone call to the IPA agent; and direct the phone call to the other agent when determining to direct the phone call to the other agent.

The circuits may be configured to determine to direct the phone call to the IPA agent when detecting a predefined IPA indicator in the request.

The predefined IPA indicator may include a unique sequence of dialed symbols.

The predefined IPA indicator consists of a unique dialed symbol.

The predefined IPA indicator may include unique audio content.

The circuits may be configured to inform the IPA agent about an upstream resource allocated for conveying upstream audio from the phone to the IPA agent.

The circuits may be configured to inform the IPA agent about a downstream resource allocated for conveying downstream audio from the IPA agent.

The circuits may be configured to receive, over the downstream resource, downstream audio from the IPA agent; and convey the downstream audio to the phone.

The downstream source and the upstream source may be time division multiplexing (TDM) slots.

The circuits may be configured to receive the request to initiate a phone call from a phone having a type that may be selected out of multiple types of phones, wherein the multiple types of phones may include a voice over internet protocol (VoIP) phone, a plain old telephone service (POTS) phone and a digital enhanced cordless telecommunication (DECT) phone.

The circuits may include a first circuit and a second circuit; wherein the first circuit may be configured to receive a request to initiate a phone call of a first type of phone calls and to determine whether to direct the phone call of the first type to the IPA agent; and wherein the second circuit may be configured to receive a request to initiate a phone call of a second type of phone calls and to determine whether to direct the phone call of the second type to the IPA agent.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
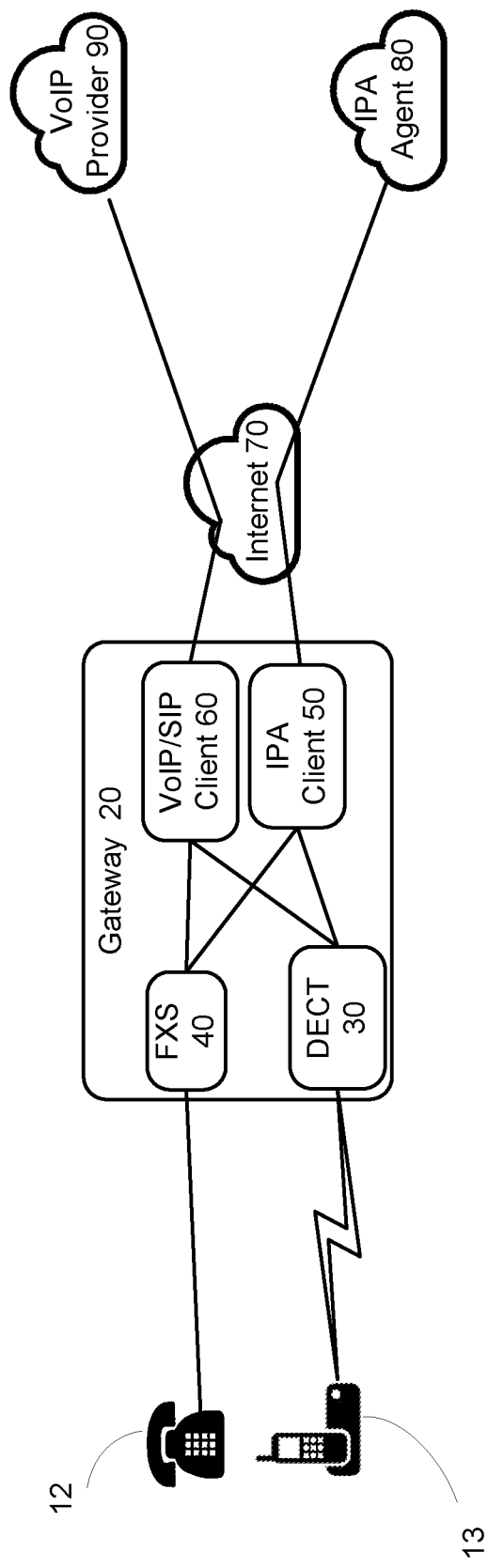
FIG. 1 illustrates an example of a gateway and its environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and to a computer program product that stores instructions for executing the method.

Any reference in the specification to a system should be applied mutatis mutandis to a method that may be executed by the system to a computer program product that stores instructions for executing the method.

Any reference in the specification to a computer program product should be applied mutatis mutandis to a method that is performed when executing instructions stored in the computer program product and to a system capable of executing the instructions stored in the computer program product.

There may be provided a method, computer program product and a system that enable a phone terminal such as a POTS phone and/or VoIP phone and/or a cordless DECT phone to access a voice interactive intelligent personal assistant.

The phone terminal may or may not be modified to allow the access to the voice interactive intelligent personal assistants via an IPA agent.

A gateway may be provided and may include an IPA client that receives phone calls from the phone terminal and decides (when detecting a predefined IPA indicator) to direct the phone call to an IPA agent (that accesses the voice interactive intelligent personal assistant and/or implements the voice interactive intelligent personal assistant.

The phone terminal may communicate with a gateway using (solely or mainly) wired infrastructure. For example—a PTOS phone and a VoIP phones that are not cordless will be coupled to the gateway via a wired infrastructure. A DECT phone will wirelessly communicate with a DECT base station that in turn communicates with the gateway via a wired infrastructure.

The gateway may also include another agent (VoIP and/or SIP agent) for managing "normal" phone calls. Normal phone calls may be phone calls that are not aimed to the IPA—for example phone calls aimed to other phones—wireless or not wireless phones.

The predefined IPA indicator may have various forms—for example:
  a. A phone terminal (or cordless headset HS) without any change (i.e. off the shelf phone) can use a pre-defined dialed prefix to indicate routing to the IPA agent. E.g. the sequence can be: user dials "*" "what is the weather in London?" [ option suffix e.g. '#' also may apply]
  b. A modified phone to allow easier access to IPA agent, e.g. by dedicated key or even fully voice activated functionality, e.g. "Hello my phone, what is the weather in London?"

If the predefined IPA indication is not received then the call is routed to a regular (normal, not IPA agent) channel/phone such as a phone channel or a VoIP channel.

Yet other examples include:
1. Un-modified phone terminal
  a. User picks up handset and dial "*"—a voice call is made between handset and gateway
  b. App in gateway will start collecting audio from the DECT (or in case of POTS: from the FXS)
  c. App will pass the collected audio to IPA Client which in turn will send it to IPA Agent
  d. When user stops talking e.g. finished asking the question "what is the temperature in London?" it will dial a digit "#" for example. This will issue an "end of query" trigger.
  e. When App in gateway receives the "#" it will stop collecting audio and inform IPA Client there is no more audio to be sent to IPA Agent
  f. IPA Agent will process the question and will send an audio response to the IPA Client
  g. The IPA Client will send the audio to the DECT to be sent to the handset so user can hear the audio response (or in case of POTS: The IPA Client will send the audio to the FXS so POTS Phone user can hear the audio response).
  h. User can now press "*" again to send a new question (repeat from step a)
  i. User can end the call, as any call termination.
2. Modified phone terminal—with vocal wake-up trigger
  a. A Handset (or any other phone type) will be able to receive a "wake up" vocal phrase, and establish a voice link to the Gateway. E.g. user can say "Hello my phone", where "Hello my phone" is an example of the wake-up vocal phrase.
  b. App in gateway will start collecting audio from the DECT (or in case of POTS: from the FXS)
  c. App will pass the collected audio to IPA Client which in turn will send it to IPA Agent
  d. When user stops talking e.g. finished asking the question e.g. "what is the temperature in London?" the system can either detect the end of question or any other mean to terminate the audio collection and issue an "end of query" trigger.
  e. When App in gateway receives the "end of query" trigger it will stop collecting audio and inform IPA Client there is no more audio to be sent to IPA Agent
  f. IPA Agent will process the question and will send an audio response to the IPA Client
  g. The IPA Client will send the audio to the DECT to be sent to the handset so user can hear the audio response (or in case of POTS: The IPA Client will send the audio to the FXS so POTS Phone user can hear the audio response).
  h. User can issue another query using the wake-up trigger again (repeat from step a)
  i. User can end the call, as any call termination.
3. Modified phone terminal—with a dedicated key
  a. A Handset (or any other phone type) will be equipped with a dedicated key/button, that once being pressed will establish a voice link to the Gateway and start a query session to the IPA.
  b. App in gateway will start collecting audio from the DECT (or in case of POTS: from the FXS)
  c. App will pass the collected audio to IPA Client which in turn will send it to IPA Agent
  d. When user stops talking e.g. finished asking the question e.g. "what is the temperature in London?" the system can either detect the end of question or user can press the key again to terminate the audio collection and issue an "end of query" trigger.
  e. When App in gateway receives the "end of query" trigger it will stop collecting audio and inform IPA Client there is no more audio to be sent to IPA Agent
  f. IPA Agent will process the question and will send an audio response to the IPA Client
  g. The IPA Client will send the audio to the DECT to be sent to the handset so user can hear the audio response (or in case of POTS: The IPA Client will send the audio to the FXS so POTS Phone user can hear the audio response).
  h. User can issue another query using the wake-up trigger again (repeat from step a)
  i. User can end the call, as any call termination.
  j. Note: the key can also function in a different way, e.g. as long as the key is being pressed the session on going, and once the key is released the session is terminated.

This suggested solution will allow using existing infrastructure (phone terminals) and dramatically reduce the cost (to the end user) of accessing voice interactive intelligent personal assistant. The cost of implementing the suggested method is small and a single gateway (modified as suggested above) can serve a large number of end users—thus making the suggested solution cost effective and highly beneficial.

This solution may replace the usage of dedicated device (e.g. Amazon Echo) which may be relatively high.

FIG. 1 illustrates an example of a gateway 20 and its environment.

On one end—gateway is coupled to a POTS phone 12 and a DECT phone 13.

On the other end—gateway 20 is coupled (via a network such as the Internet) to an IPA agent 80 and to another agent such as VoIP provider 90.

It should be noted that the gateway may be coupled to additional, fewer and/or other types of phones and that a single gateway may service much more than two phones. The gateway may be coupled to additional, fewer, other agents.

The gateway 20 includes a foreign exchange subscriber (FXS) circuit 40 for receiving phone calls from phone such as POTS phone 12, DECT circuit 30 for receiving phone calls from DECT phone 13 (rather from DECT base station), IPA client 50 and another client such as VoIP/SIP client 60. SIP stands for session initiation protocol. SIP may include VoIP.

IPA client 50 of gateway 20 communicates over a network such as the internet with IPA agent 80.

VoIP/SIP client 60 of gateway 20 communicates over a network such as the internet with VoIP/SIP client 60.

Other types of clients of the gateway may communicate with other agents.

FXS circuit 40 is configured to receive a phone call from POTS phone 12 and to determine whether to direct the phone call to VoIP/SIP client 60 or to IPA client 50.

DECT circuit 30 is configured to receive a phone call from DECT phone 13 and to determine whether to direct the phone call to VoIP/SIP client 60 or to IPA client 50.

Figure 2:
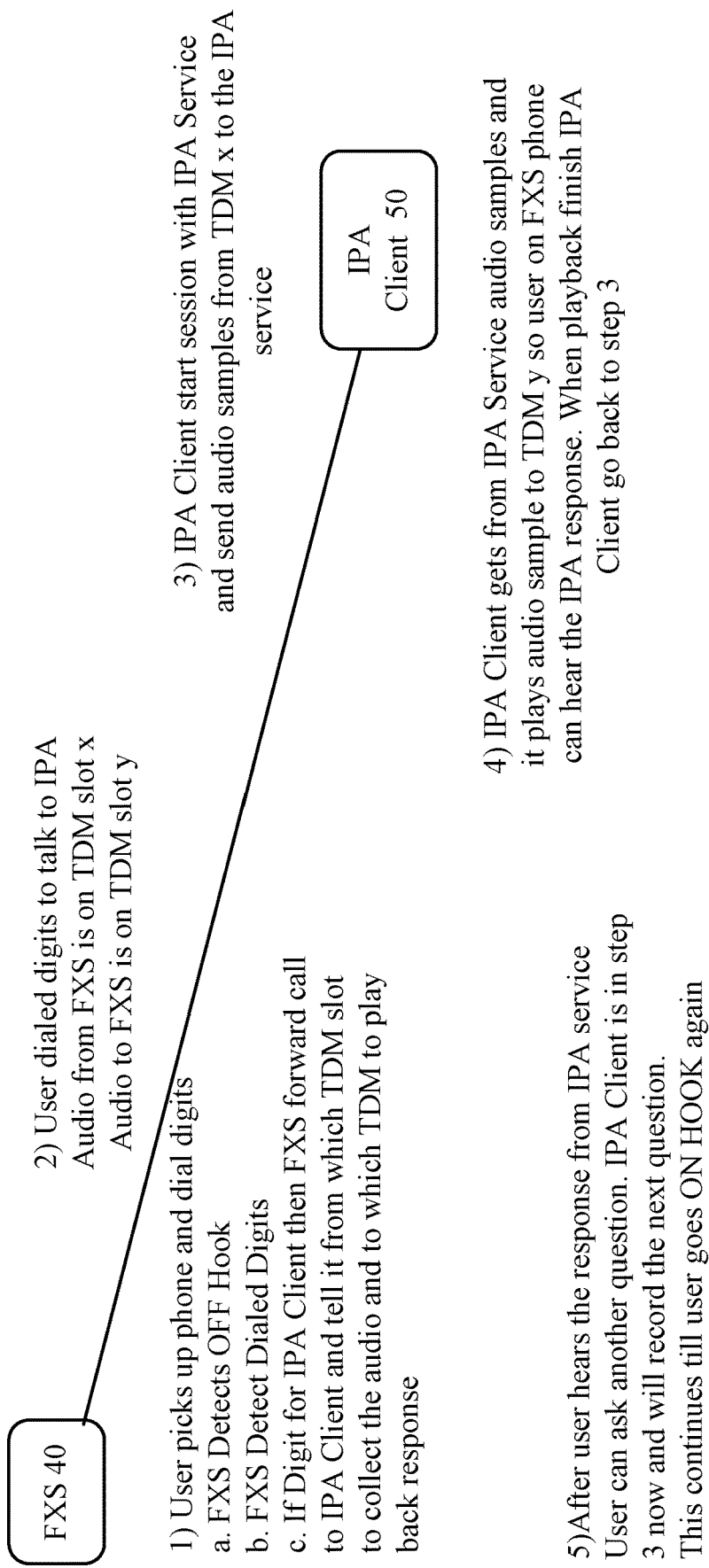
FIG. 2 illustrates an example of an exchange of signals and content between the gateway and an IPA agent.

FIG. 2 illustrates illustrates an example of an exchange of signals and content between the gateway (especially FXS circuit 40) and an IPA agent.

The exchange of signals includes:
a. FXS circuit 40 detects an OFF hock situation—a user picked up the POTS phone 12.
b. FXS circuit 40 detects one or more dialed digits that were dialed by the user after the user picked up the POTS phone 12.
c. Determining by the FXS circuit 40 if the dialed signals are indicative of a phone call aimed to the IPA agent.
d. If determining that the dialed signals are indicative of a phone call aimed to the IPA agent then allocating upstream and/or downstream resources for upstream and/or downstream audio associated with the phone call. The upstream and/or downstream resources may be TDM slots or any other resource such as frequency, time window, code and the like.
e. Notifying the IPA client about the allocation of resources—for example "Audio from FXS is on TDM slot x. Audio to FXS is on TDM slot y".
f. IPA client 50 start session with the IPA service (via the IPA agent) and send upstream audio samples (originated by the user) from TDM x to the IPA service.
g. IPA client 50 gets from IPA service (via IPA agent) downstream audio samples (for example—at TDM slot y).
h. The gateway sends the downstream audio samples to POTS phone 12 and the user hears the message embedded in the downstream audio samples. The message may be a response of the IPA service to a query or commands from the user.

One or more repetitions of sending upstream audio content to the IPA service and receiving downstream audio content may be executed. The resource allocation may remain the same during the repetition or be changes at least once.

The phone call ends when the FXS circuit 40 detects a hang off (HANG ON) event.

Figure 3:
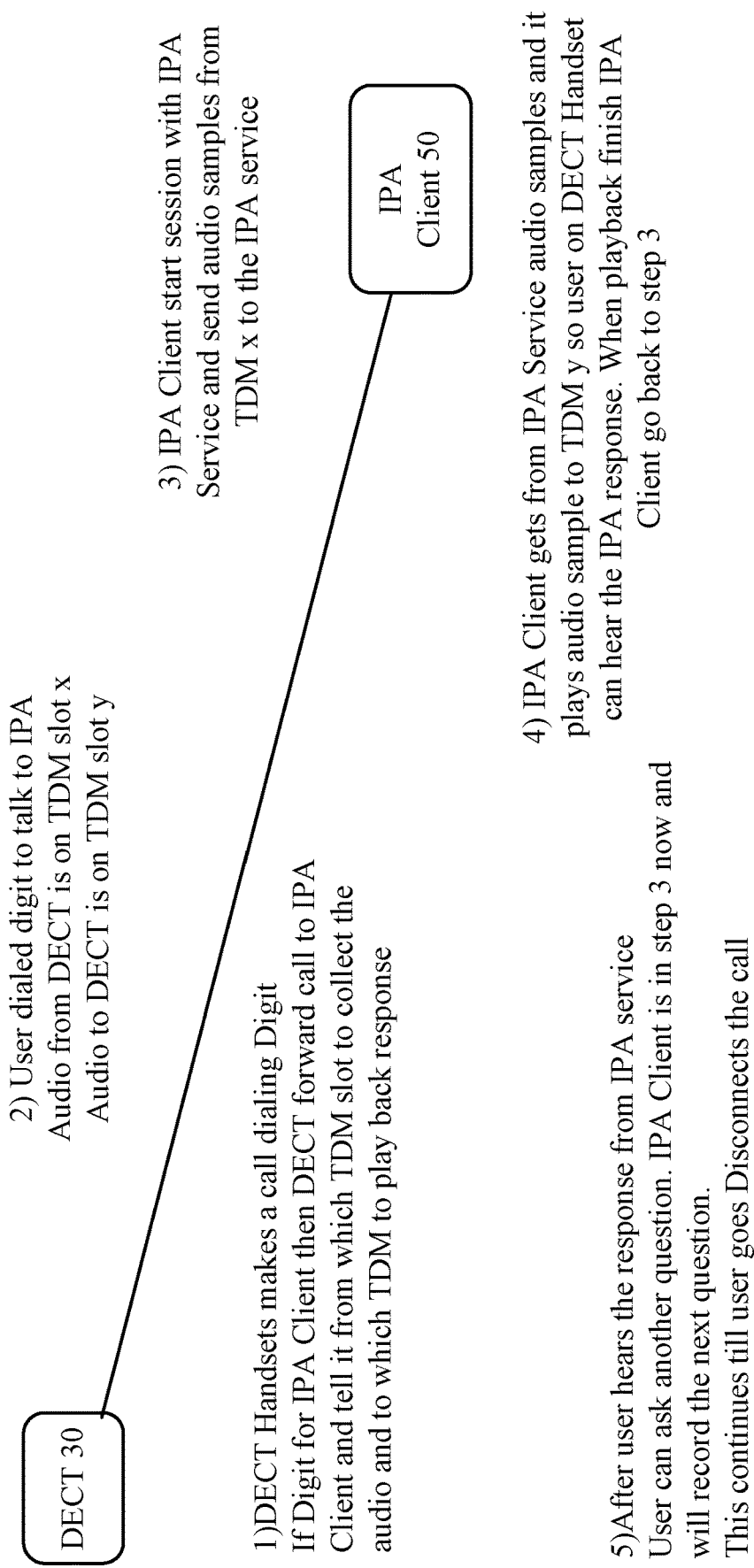
FIG. 3 illustrates an example of an exchange of signals and content between the gateway and an IPA agent.

FIG. 3 illustrates an example of an exchange of signals and content between the gateway and an IPA agent.

The exchange of signals includes:
a. DECT circuit 30 detects an OFF hock situation—a user picked up the DECT phone 13.
b. DECT circuit 30 detects one or more dialed digits that were dialed by the user after the user picked up the DECT phone 13.
c. Determining by the DECT circuit 30 if the dialed signals are indicative of a phone call aimed to the IPA agent.
d. If determining that the dialed signals are indicative of a phone call aimed to the IPA agent then allocating upstream and/or downstream resources for upstream and/or downstream audio associated with the phone call. The upstream and/or downstream resources may be TDM slots or any other resource such as frequency, time window, code and the like.
e. Notifying the IPA client about the allocation of resources—for example "Audio from DECT is on TDM slot x. Audio to DECT is on TDM slot y".
f. IPA client 50 start session with the IPA service (via the IPA agent) and send upstream audio samples (originated by the user) from TDM x to the IPA service.
g. IPA client 50 gets from IPA service (via IPA agent) downstream audio samples (for example—at TDM slot y).
h. The gateway sends the downstream audio samples to DECT phone 13 and the user hears the message embedded in the downstream audio samples. The message may be a response of the IPA service to a query or commands from the user.

One or more repetitions of sending upstream audio content to the IPA service and receiving downstream audio content may be executed. The resource allocation may remain the same during the repetition or be changes at least once.

In FIGS. 2 and 3 the FXS circuit or the DECT circuit respectively may detect a phone call to the IPA agent based on a unique audio content (such as keyword). This may involve speech analysis and/or searching for the unique audio content in other manners.

Figure 4:
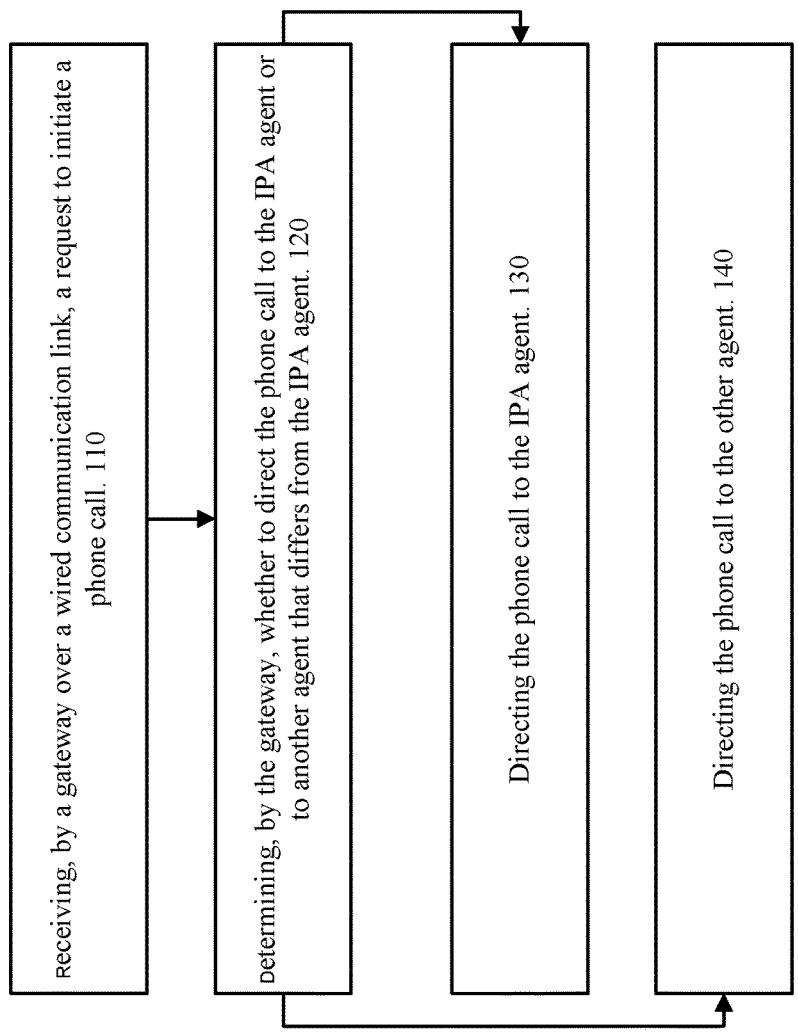
FIG. 4 illustrates an example of a method.

FIG. 4 illustrates an example of method 100.

Method 100 is for accessing an intelligent personal assistant (IPA).

Method 100 may start by step 110 of receiving, by a gateway over a wired communication link, a request to initiate a phone call.

Step 110 may be followed by step 120 of determining, by the gateway, whether to direct the phone call to the IPA agent or to another agent that differs from the IPA agent.

If determining to direct the phone call to the IPA agent, then step 120 may be followed by step 130 of directing the phone call to the IPA agent.

If determining to direct the phone call to the other agent, then step 120 may be followed by step 140 of directing the phone call to the other agent.

Step 120 may include determining to direct the phone call to the IPA agent when detecting a predefined IPA indicator in the request. The predefined IPA indicator or information about the IPA indicator should be provided to and/or programmed in the gateway.

The predefined IPA indicator may include a unique sequence of dialed symbols, may consist of a unique dialed symbol, and/or may be a unique audio content (such as keyword).

Step 130 may include at least one out of (a) informing the IPA agent about an upstream resource allocated for conveying upstream audio from the phone to the IPA agent, (b) informing the IPA agent about a downstream resource allocated for conveying downstream audio from the IPA agent, (c) requesting the IPA agent (or another entity) to allocate an upstream resource for conveying upstream audio from the phone to the IPA agent, and (d) requesting the IPA agent (or another entity) to allocate a downstream resource for conveying downstream audio from the IPA agent.

An allocation of any resource may be executed in any manner—random, pseudo random, deterministic, and the like.

The gateway may be configured to process phone calls from different types of phone using different circuits—but this is not necessarily so.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for accessing an intelligent personal assistant (IPA), the method comprises:
    receiving, by a gateway over a wired communication link, a request to initiate a phone call;
    determining, by the gateway, whether to direct the phone call to the IPA agent or to another agent that differs from the IPA agent;
    directing the phone call to the IPA agent when determining to direct the phone call to the IPA agent; wherein the directing the phone call to the IPA agent comprises informing the IPA agent about an upstream resource allocated for conveying upstream audio from the phone to the IPA agent; and
    directing the phone call to the other agent when determining to direct the phone call to the other agent.

2. The method according to claim 1 comprising determining to direct the phone call to the IPA agent when detecting a predefined IPA indicator in the request.

3. The method according to claim 2 wherein the predefined IPA indicator comprises a unique sequence of dialed symbols.

4. The method according to claim 2 wherein the predefined IPA indicator consists of a unique dialed symbol.

5. The method according to claim 2 wherein the predefined IPA indicator comprises unique audio content.

6. The method according to claim 1 comprising receiving a request to initiate a phone call of a first type of phone calls by a first circuit of the gateway; determining, by the first circuit, whether to direct the phone call of the first type to the IPA agent; receiving a request to initiate a phone call of a second type of phone calls by a second circuit of the gateway; and determining, by the second circuit, whether to direct the phone call of the second type to the IPA agent.

7. The method according to claim 1 comprising informing the IPA agent about a downstream resource allocated for conveying downstream audio from the IPA agent.

8. The method according to claim 7 comprising receiving, over the downstream resource, downstream audio from the IPA agent; and conveying the downstream audio to the phone.

9. The method according to claim 8 wherein the downstream source and the upstream source are time division multiplexing (TDM) slots.

10. The method according to claim 1 comprising receiving the request to initiate a phone call from a phone having a type that is selected out of multiple types of phones, wherein the multiple types of phones comprise a voice over internet protocol (VoIP) phone, a plain old telephone service (POTS) phone and a digital enhanced cordless telecommunication (DECT) phone.

11. A method for accessing an intelligent personal assistant (IPA), the method comprises:
receiving, over a wired communication line, a request to initiate a phone call of a first type of phone calls by a first circuit of a gateway;
determining, by the first circuit, whether to direct the phone call of the first type to an IPA agent;
directing the phone call of the first type to the IPA agent when determining to direct the phone call to the IPA agent;
receiving, over the wired communication line, a request to initiate a phone call of a second type of phone calls by a second circuit of the gateway;
determining, by the second circuit, whether to direct the phone call of the second type to another agent that differs from the IPA agent; and
directing the phone call of the second type to the other agent when determining to direct the phone call of the second type to the other agent.

12. A computer program product that stores instructions that once executed by a gateway causes the gateway to perform the steps of:
receiving, by a gateway over a wired communication link, a request to initiate a phone call;
determining, by the gateway, whether to direct the phone call to an intelligent personal assistant (IPA) agent or to another agent that differs from the IPA agent;
directing the phone call to the IPA agent when determining to direct the phone call to the IPA agent; wherein the directing the phone call to the IPA agent comprises informing the IPA agent about an upstream resource allocated for conveying upstream audio from the phone to the IPA agent; and
directing the phone call to the other agent when determining to direct the phone call to the other agent.

13. The computer program product according to claim 12 that stores instructions for determining to direct the phone call to the IPA agent when detecting a predefined IPA indicator in the request.

14. The computer program product according to claim 13 wherein the predefined IPA indicator comprises a unique sequence of dialed symbols.

15. The computer program product according to claim 13 wherein the predefined IPA indicator consists of a unique dialed symbol.

16. The computer program product according to claim 13 wherein the predefined IPA indicator comprises unique audio content.

17. The computer program product according to claim 12 that stores instructions for:
receiving a request to initiate a phone call of a first type of phone calls by a first circuit of the gateway;
determining, by the first circuit, whether to direct the phone call of the first type to the IPA agent;
receiving a request to initiate a phone call of a second type of phone calls by a second circuit of the gateway; and
determining, by the second circuit, whether to direct the phone call of the second type to the IPA agent.

18. The computer program product according to claim 12 that stores instructions for informing the IPA agent about a downstream resource allocated for conveying downstream audio from the IPA agent.

19. The computer program product according to claim 18 that stores instructions for receiving, over the downstream resource, downstream audio from the IPA agent; and conveying the downstream audio to the phone.

20. The computer program product according to claim 8 wherein the downstream source and the upstream source are time division multiplexing (TDM) slots.

21. The computer program product according to claim 12 that stores instructions for receiving the request to initiate a phone call from a phone having a type that is selected out of multiple types of phones, wherein the multiple types of phones comprise a voice over internet protocol (VoIP) phone, a plain old telephone service (POTS) phone and a digital enhanced cordless telecommunication (DECT) phone.

22. A computer program product that stores instructions that once executed by a gateway causes the gateway to perform the steps of:
receiving, over a wired communication line, a request to initiate a phone call of a first type of phone calls by a first circuit of a gateway;
determining, by the first circuit, whether to direct the phone call of the first type to an IPA agent;
directing the phone call of the first type to the IPA agent when determining to direct the phone call of the first type to the IPA agent;
receiving, over the wired communication line, a request to initiate a phone call of a second type of phone calls by a second circuit of the gateway;
determining, by the second circuit, whether to direct the phone call of the second type to another agent that differs from the IPA agent; and
directing the phone call of the second type to the other agent when determining to direct the phone call of the second type to the other agent.

23. A gateway having intelligent personal assistant (IPA) access capabilities, wherein the gateway comprises circuits that comprise a hardware processor, wherein the circuits are configured to:
receive, over a wired communication link, a request to initiate a phone call;
determine whether to direct the phone call to an intelligent personal assistant (IPA) agent or to another agent that differs from the IPA agent;
direct the phone call to the IPA agent when determining to direct the phone call to the IPA agent; wherein the directing the phone call to the IPA agent comprises informing the IPA agent about an upstream resource allocated for conveying upstream audio from the phone to the IPA agent; and
direct the phone call to the other agent when determining to direct the phone call to the other agent.

24. The gateway according to claim 23 wherein the circuits comprise a first circuit and a second circuit; wherein the first circuit is configured to receive a request to initiate a phone call of a first type of phone calls and determine whether to direct the phone call of the first type to the IPA agent; wherein the second circuit is configured to receive a request to initiate a phone call of a second type of phone calls and determine whether to direct the phone call of the second type to the IPA agent.

* * * * *